United States Patent
Bootha

[11] 3,750,241
[45] Aug. 7, 1973

[54] PIPE CLAMPS
[76] Inventor: Hendrik Johannes Bootha, 6 Judith St., Thabazimbi, Transvaal, Republic of South Africa
[22] Filed: Oct. 29, 1971
[21] Appl. No.: 193,844

[52] U.S. Cl. .............................................. 24/279
[51] Int. Cl. ......................................... B65d 63/02
[58] Field of Search ...................... 24/279; 285/366, 285/367

[56] References Cited
UNITED STATES PATENTS
| | | | |
|---|---|---|---|
| 499,760 | 6/1893 | Sherman | 24/279 |
| 1,291,471 | 1/1919 | Funk | 24/279 |

FOREIGN PATENTS OR APPLICATIONS
| | | | |
|---|---|---|---|
| 241,467 | 10/1925 | Great Britain | 24/279 |
| 1,132,598 | 11/1968 | Great Britain | 24/279 |

Primary Examiner—Bernard A. Gelak
Assistant Examiner—Kenneth J. Dorner
Attorney—Irvin S. Thompson, Robert J. Patch et al.

[57] ABSTRACT

The invention relates to a metal clamp for circular tubing composed of a band formed exactly to the final diameter required. At the ends of the formed loop the band is formed to provide flanges and at one end a tongue that penetrates a slot in the opposed flange. The flanges are drawn together by means of a bolt passing through box sections butressing each flange.

2 Claims, 3 Drawing Figures

PIPE CLAMPS

The present invention relates to metal clamps of the kind used for coupling a length of circular tubing to a circular tubular member adapted to fit within one end of the circular tubing.

Metal clamps of this kind usually consist of a flexible metal band bent generally into a circular shape and adapted to surround the circular tubing. The band is provided with means whereby the one end of the band may be moved relative to the other to diminish the diameter of the band and thus tighten it around the circular tubing. The tightening means including means for releasably securing the band in the tightened position. However with these known clamps it is found that the metal band does not retain its circular form which may lead to unclamped portions. This is disadvantageous particularly where the circular tubing is made of plastic and can lead eventually to leakage at the coupling.

It is an object of the invention to provide a metal clamp of the kind described which substantially eliminates this disadvantage.

A clamp according to the invention includes a length of flexible metal band bent into generally circular form and having at or adjacent each of its ends an outward radial flange, the flanges being spaced apart from one another when the clamp is open, a right angled bracing member between each flange and the outer surface of the band and means for drawing the flanges together to form an exactly circular band.

Further according to the invention, the flanges are formed by outwardly turned end portions of the band.

Still further according to the invention, a tongue is formed at or adjacent the junction of the band and one flange and a slot is formed at or adjacent the junction of the band and the other flange, the tongue being adapted to engage slidably through the slot.

In the accompanying drawing which illustrates the invention by way of example,

Figure 1:
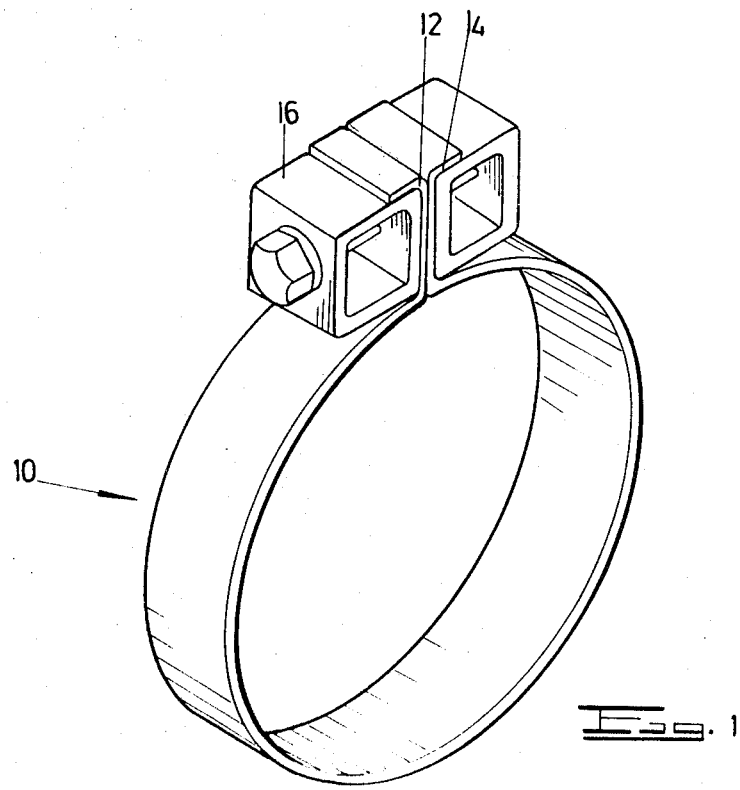
FIG. 1 is a perspective view of a clamp according to the invention.
Figure 2:
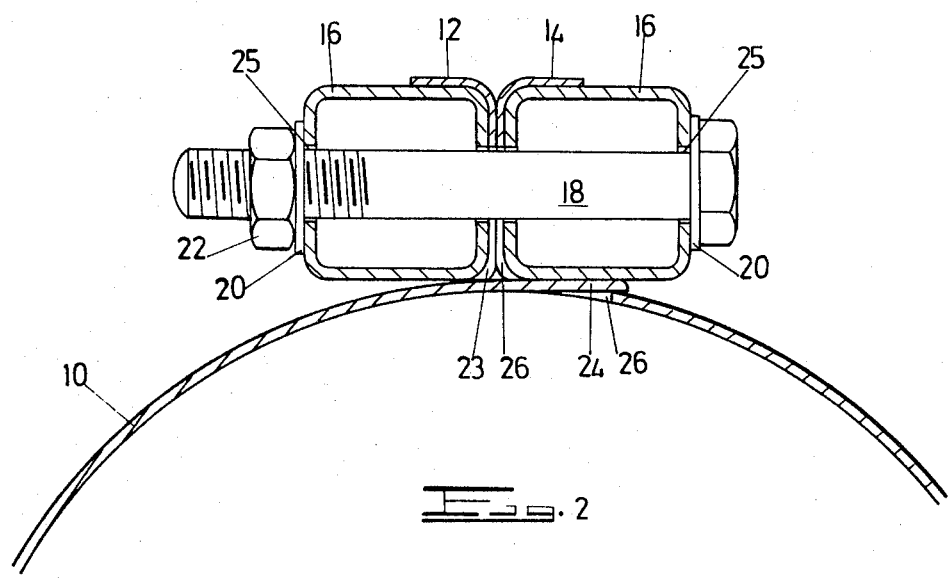
FIG. 2 is a fragmentary section of the clamp of FIG. 1.
Figure 3:
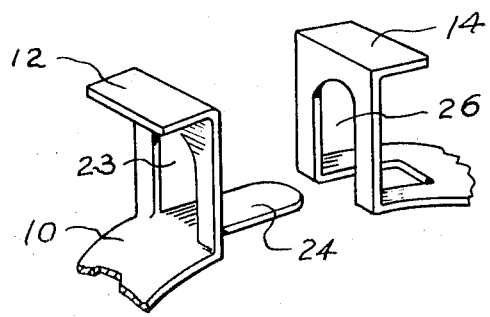
FIG. 3 is a fragmentary perspective view of a portion of FIG. 1 but with the band ends separated and the bracing members and bolt removed.

The clamp comprises a metal band 10 of constant width throughout its length bent into generally circular shape and having its ends turned outwardly to form flanges 12 and 14 extending at right angles to the band 10. At its upper end each flange is turned back on itself so as to form with the band 10 a socket for receiving a right angled bracing member 16. Each bracing member 16 comprises a metal element of box section.

A tongue 24 which is pressed out of the metal of the flange 12 leaving a slot 23 in the flange 12 is freely slidable through the lower portion of a slot 26 cut in the metal of the flange 14 and the adjacent portion of the band 10. That end of the slot 26 which terminates in the band 10 is square whilst its other end which terminates in the flange 14 is rounded. Similarly, the upper end of the slot 23 is also rounded and terminates at the same level as the upper end of the slot 26.

A bolt 18, equipped with washers 20 and a nut 22 extends through apertures 25 provided in the bracing members 16 and through the upper ends of the slots 23 and 26.

In use, the nut 22 is unscrewed to separate the flanges 12 and 14 and the clamp positioned over the circular tubing to be clamped. The nut 22 is then tightened to draw the flanges 12 and 14 against each other and thus tighten the clamp about the tubing. When fully tightened the clamp appears as in the drawings.

It will be noted that as the clamp is tightened the flanges 12 and 14 are maintained at right angles to the band portions adjacent them, by means of the bracing members 16 and that when the clamp has been fully tightened the band 10 is exactly circular. The slight gap between the band portions adjacent the flanges 12 and 14 is bridged by the tongue 24. It should be noted that the tongue 24 can enter and travel unrestrictedly beneath the bracing member 16 with the result that the tongue 24 cannot be distorted regardless of the pressure exerted on it. As a result of the exactly circular shape of the band when the clamp is pulled up on the tubing and the fact that the band is of constant width throughout its circumference, an equal pressure is brought to bear on each point of the circumference of the clamped tubing leaving no unclamped portion of the band and no distorted portion through which leakage may occur.

It will also be seen that the bolt 18 passes through the slots 23 and 26. Thus the band portions which in tightened clamps lie between the members 16, do not have to be parallel on commencement of the tightening operation for the bolt to pass through them. This facilitates the assembly of the clamp in use. The bolt will bear against the outer edges of the slot which is preferably semi-circular in plan.

I claim:

1. A pipe clamp comprising a length of flexible metal band, having a constant width throughout its length, bent into circular form, the ends of the band being bent into outwardly directed radial flanges, a bracing member abutting each flange and the outer surface of the band, a bolt passing through the bracing members and flanges, a tongue pressed out of the material of one flange to define a slot, one end of which passes over and bears on the bolt, a second slot in the other flange one end of which passes over and bears on the bolt and the other end of which extends into the circular portion of the band, the tongue passing through the second slot so that when the flanges abut, the circular portion of the band and the tongue form substantially a perfect circle.

2. A pipe clamp as claimed in claim 1, said one end of each said slot being rounded.

* * * * *